United States Patent
Marquez-Sanchez et al.

(10) Patent No.: US 7,122,122 B2
(45) Date of Patent: Oct. 17, 2006

(54) MOLECULAR IMPRINTING OF SOLUTE ON CELLULOSE/SILICA COMPOSITE, AND PRODUCTS AND USES THEREOF

(75) Inventors: Manuel Marquez-Sanchez, Lincolnshire, IL (US); Gustavo Larsen, Lincoln, NE (US); Ahmad Akashe, Mundelein, IL (US); David Vu, Lincoln, NE (US); Rajinder S. Gill, Lincoln, NE (US)

(73) Assignee: Kraft Foods Holdings, Inc., Northfield, IL (US)

( * ) Notice: Subject to any disclaimer, the term of this patent is extended or adjusted under 35 U.S.C. 154(b) by 155 days.

(21) Appl. No.: 10/624,229

(22) Filed: Jul. 22, 2003

(65) Prior Publication Data

US 2005/0016923 A1 Jan. 27, 2005

(51) Int. Cl.
- *C02F 9/00* (2006.01)
- *B01D 37/00* (2006.01)
- *B05D 3/00* (2006.01)

(52) U.S. Cl. .................. 210/663; 210/502.1; 210/504; 210/508; 210/690; 210/691; 426/495; 426/590; 426/594; 426/601; 427/244; 427/271; 427/273

(58) Field of Classification Search ............ 210/502.1, 210/650, 651, 767, 504–509, 663, 656, 679, 210/690, 691; 427/331, 384, 244–246, 256, 427/271, 273; 55/524, 527; 426/330, 594, 426/490, 495, 590, 596, 601–605, 20–23
See application file for complete search history.

(56) References Cited

U.S. PATENT DOCUMENTS

| | | | | |
|---|---|---|---|---|
| 3,327,718 | A | | 6/1967 | Kilburn |
| 5,855,788 | A | * | 1/1999 | Everhart et al. ............. 210/653 |
| 5,906,743 | A | * | 5/1999 | Cohen et al. ............. 210/502.1 |
| 6,057,377 | A | * | 5/2000 | Sasaki et al. ................. 521/99 |
| 6,461,873 | B1 | * | 10/2002 | Catania et al. ............. 436/518 |
| 2001/0040136 | A1 | * | 11/2001 | Wei et al. |
| 2002/0142291 | A1 | * | 10/2002 | Bauer et al. .................... 435/5 |
| 2004/0173506 | A1 | * | 9/2004 | Doktycz et al. ............. 210/85 |
| 2005/0153386 | A1 | * | 7/2005 | Farwell et al. ................ 435/34 |

FOREIGN PATENT DOCUMENTS

| | | |
|---|---|---|
| EP | 1061124 | 12/2000 |
| JP | 63224734 | 4/1988 |

OTHER PUBLICATIONS

Malitesta et al., Analytical Chemistry, vol. 71, (1999) 1366-1370.
Yoshikawa et al., Journal of Membrane Science, 108, (1995) 171-175.

(Continued)

*Primary Examiner*—Joseph Drodge
(74) *Attorney, Agent, or Firm*—Fitch, Even, Tabin & Flannery

(57) ABSTRACT

A cellulose/silica composite useful as a filter material is highly selective towards a solute that has been molecularly imprinted upon an inorganic gel coating formed on the cellulose. The filter material provides dual filtering functionality, as both a selective molecular sieve and as a particulate filter. A unique method for making the filter material is also set forth that imparts these attributes and performance capabilities.

19 Claims, 4 Drawing Sheets

OTHER PUBLICATIONS

Wang et al., American Chemical Society, 12, (1996) 4850-4856.
Krotz et al., American Chemical Society, 118, (1996) 8154-8155.
Shea et al., American Chemical Society, 43 (1978) 4253-4255.
Damen et al., American Chemical Society, 21 (1980) 1913-1916.
Glad et al., Journal of Chromatography, 347, (1985) 11-23.
Vlatakis et al., Nature, 361 (1993) 645-647.
Kobayashi et al., Chemistry Letters, (1995) 927-928.
Vu et al., Microporous and Mesoporous Materials, 55 (2002) 93-101.
Morihara eet al., Bull. Chemical Society Japan, 61 (1988) 3991-3998.
Morihara et al., Bull. Chemical Society Japan, 67 (1994) 1078-1084.
Kobayashi et al., American Chemical Society, 13, (1988) 188-201.

* cited by examiner

DATA: DATA1_D
MODEL: LANGMUIREXT2

$CH^2/DOF = 2.1672E-8$
$R^2 = 0.99176$
A 168.35174 ±4.18811
B 285.8268 ±28.27079
C 0.5 ±0

MOLECULAR IMPRINTING OF SOLUTE ON CELLULOSE/SILICA COMPOSITE, AND PRODUCTS AND USES THEREOF

FIELD OF THE INVENTION

This invention relates to methods for making a cellulose/silica composite comprising molecularly imprinted paper (MIP) based on molecular imprinting of an intended solute on the cellulose/silica composites and to filters prepared from such composites. The cellulose/silica composites are well-suited for filters functioning as selective molecular sieves that show enhanced binding capability and selectivity towards solute that has been molecularly imprinted upon the composite.

BACKGROUND OF THE INVENTION

There is a need for adsorbent filters that can be conveniently used as molecular sieves to selectively and stably eliminate undesired solutes from liquids. The solutes to be filtered out may include pollutants or materials considered unhealthy or otherwise undesirable by persons who intend to consume the liquids or other compositions in which the solute is present.

The practice in the past has focused on reacting the targeted molecule to be removed with another binding chemical followed by a separation step, such as precipitation, centrifugation, or co-crystallization, and so forth. The addition of other compounds or molecules to the media to react or complex with the target substrate is usually tedious, timely consuming, and can not fully remove all of the added reactant and substrates in the product media.

A porous membrane with molecular sieving characteristics based on matrices of cellulose has been described by Mintova et al. (Zeolites 16 (1996) 31). Cellulose-based soft membranes of Y and L zeolites (i.e., aluminosilicates) have been prepared by Vu et al. (Microporous and Mesoporous Materials 55 (2002) 93–101).

Cellulose/silica composites have found applications in cosmetics (e.g., tissue conditioner) (Nikawa et al., J. Oral Rehabil. 24 (1997) 350); fabric softeners (EPO Pat. No. 1,061,124 (2000)); medical fields (e.g., antibacterial materials and protection of denture plaque) (Nikawa, J. Oral Rehabil. 24 (1997) 350); and for removal of foul smells (e.g., $NH_3$, $H_2S$, and $EtNH_2$) (JP Pat. No. 63,224,734 (1988); JP Pat. No. 86,241,059 (1988)).

These materials also can be used for filtration as ultra filtration membranes (Mara et al., J. Membr. Sci. 36 (1988) 277); tobacco smoke filters (U.S. Pat. No. 3,327,718); in water purification (JP Pat. 92,286,299 (1994)); and in air purification (JP Pat. 92,129,440 (1993)).

Prior methods for making adsorbent composites of fibers and absorbent mineral particles like zeolite, or silica, have involved the use of adhesive polymers. JP Pat. 2,000, 189, 793 (2000); Fujio, M., Hyomen Kagaku 19 (1998) 658; Sano et al., Proc. Int. Zeolite Conf., 9th (1993) 239–246. The adhesion method has several disadvantages. Mintova et al., Preparation of Zeolite-Covered Cellulose Fibers, 209th National Meeting Abstracts, American Chemical Society, (1995). The major disadvantages include the possibility of the adhesive dissolving, totally or partially during filtration, and/or might potential interference with the selective adsorption process.

Another prior method for making the fiber/absorbent particle types of composites has involved the use of electret technology, such as described in U.S. Pat. No. 5,906,743 (1993). However, electret technology can pose an occupational hazard due to the use of high voltage to adhere inorganic solids onto charged cellulose fibers.

Molecular imprinting is a method used to design materials for special, highly selective separation processes. A benefit of imprinted materials is the possibility to prepare the sorbents to target a specific molecule or functional groups. Since molecular recognition is emerging as a potentially useful concept in biological and chemical processes, considerable efforts have been made to prepare such materials during the past decade. See, e.g., Lehn et al., Chem., Int. Ed. Engl. (1990), 29, 1304–1319; Fabbrizzi et al., Amer. Chem. Soc. Rev. (1995), 197–202. Silica is a well known as a high surface area heterogeneous catalyst support and sorbent. Silica gel prepared in the presence of specific dye molecule ("template") shows an increased affinity for the same dye after its removal from the silica matrix. Dickey, Proc. Natl. Acad. of Sci. (1949), 35, 227–229.

A "footprint" technique has also been developed using tailor-made catalysts specific for trans-acylation; the catalysts were prepared by imprinting hypothesized transition-state analogues onto alumina ion-doped silica gels. Morihara et al., J. Bull. Chem. Soc. Jpn. (1988), 61, 3991–3998; Morihara et al., T. Bull. Chem. Soc. Jpn. (1994), 67, 1078–1084. Polymerized organic silanes have been used on the surface of porous silica particles in aqueous solutions to provide a soft layer for imprinting. Glad et al., Chromatogr. (1985), 347, 11–23. Imprinted materials have found applications in the preparation of highly selective chemical sensors. Kriz, D., et al., Anal. Chim. Acta 336 (1997) 345A; Malitesta et al., Anal. Chem. 71 (1999) 1366; Kobayashi, Chem. Lett. 927 (1995). They also have been used in controlled transport membranes. Krotz et al., J. Am. Chem. Soc. 118 (1996) 8154; Yoshikawa et al., J. Membr. Sci. 108 (1995) 171; Wang, et al., Langmuir 12 (1996) 4850; Bartsch et al., Molecular and Ionic Recognition with Imprinted Polymers, in: ACS Symposium Series 703, American Chemical Society, Washington, D.C., USA, (1998) p. 188. They additionally have been used in radioimmunoassays. Vlatakis et al., Nature (London) (1993) 361 645–647.

Molecular imprinted silicas also have been used as catalyst in stereo selective and regioselective reactions. Shea et al., J. Org. Chem. 1978 43 4253–4255; Damen et al., Tetrahedron Lett. (1980) 21 1913–1916. In further developments, layers of cross-linked polysiloxanes were produced in the presence of template molecules on previously prepared silica gel particles. A somewhat different approach, which does not rely on such layer-by-layer techniques, consists of direct adsorption of the imprinting molecule. Morihara et al., J. Bull. Chem. Soc. Jpn. (1988), 61, 3991–3998; Morihara et al., J. Chem. Soc. Chem. Commum. (1992) 358–360. However, loose granulated silica materials are not convenient for handling, use, and/or disposal in filter operations involving filtration of solutes from hot fluids.

A need still exists for self-supporting stable filters having matrices that do not structurally degrade, nor suffer from loss of adsorbent, to the extent the filter function is impaired when the filter is used in the presence of hot liquid filtrates. A need also exists for an approach to making adsorbent filters that avoids the need for extraneous substances, such as polymeric adhesives, to integrate the adsorbent and matrix.

As will become apparent from the descriptions that follow, the present invention addresses these needs as well as offers other advantages and benefits.

SUMMARY OF THE INVENTION

The present invention provides a unique adsorbent filter material in which an inorganic gel is supported upon fibrous materials, wherein the gel has been molecularly imprinted to make it capable of filtering a solute with high selectivity.

In one aspect, a filter material according to this invention is comprised of a liquid permeable fibrous support material having hydroxyl groups or hydrolyzable alkoxyl groups, and an adsorbent porous inorganic gel coating formed on the fibrous support, wherein the inorganic gel coating has been molecular imprinted for a solute therein corresponding to template molecules present during formation of the gel coating but selectively removed thereafter from the filter material, wherein the molecular imprint allows the inorganic gel coating to capture solute passing through the filter material in a liquid medium more effectively than filter medium having a similar inorganic gel coating without molecular imprinting. In one embodiment in which the solute is caffeine, the adsorbent filter material captures about 70–90 percent more of the solute when passed through the filter material in a liquid medium as compared to the gel lacking the molecular imprinting.

The present invention also relates to methods for making the enhanced filter materials. In one aspect, a method of making an adsorbent filter material according to this invention involves contacting a fibrous material comprising fibers having hydroxyl groups or hydrolyzable alkoxyl groups with a fluid containing a base that dissociates in water to generate hydroxyl ions to provide surface-treated fibers. Then, the surface-treated fibers are combined with a sol gel precursor, a gel formation solvent, and template molecules, with mixing. Next, a gel coating is formed on the surface-treated fibers, wherein the gel coating comprises molecular imprinting of a solute therein corresponding to the template molecules. The template molecules are thereafter selectively removed from the gel coating by washing the gel coating with a solvent for the template molecules, to provide a composite MIP filter material.

In the present invention, the selective removal of solutes, such as caffeine, from liquids via a MIP approach is provided. The methods of this invention are based on relatively facile wet chemical synthetic methods. Comparative adsorption studies and infrared techniques have been used to confirm that the inventive composite materials are highly selective filter materials. The MIP composites of this invention can distinguish between a targeted solute and close chemical analogs thereof with excellent selectivity. Also, this invention does not require addition of any foreign substrate or molecule, such as adhesive polymers, into the filter material.

Other advantages and benefits of the present invention will become apparent from the detailed descriptions below, which make reference to the following figures.

DETAILED DESCRIPTION OF THE INVENTION

Figure 1:
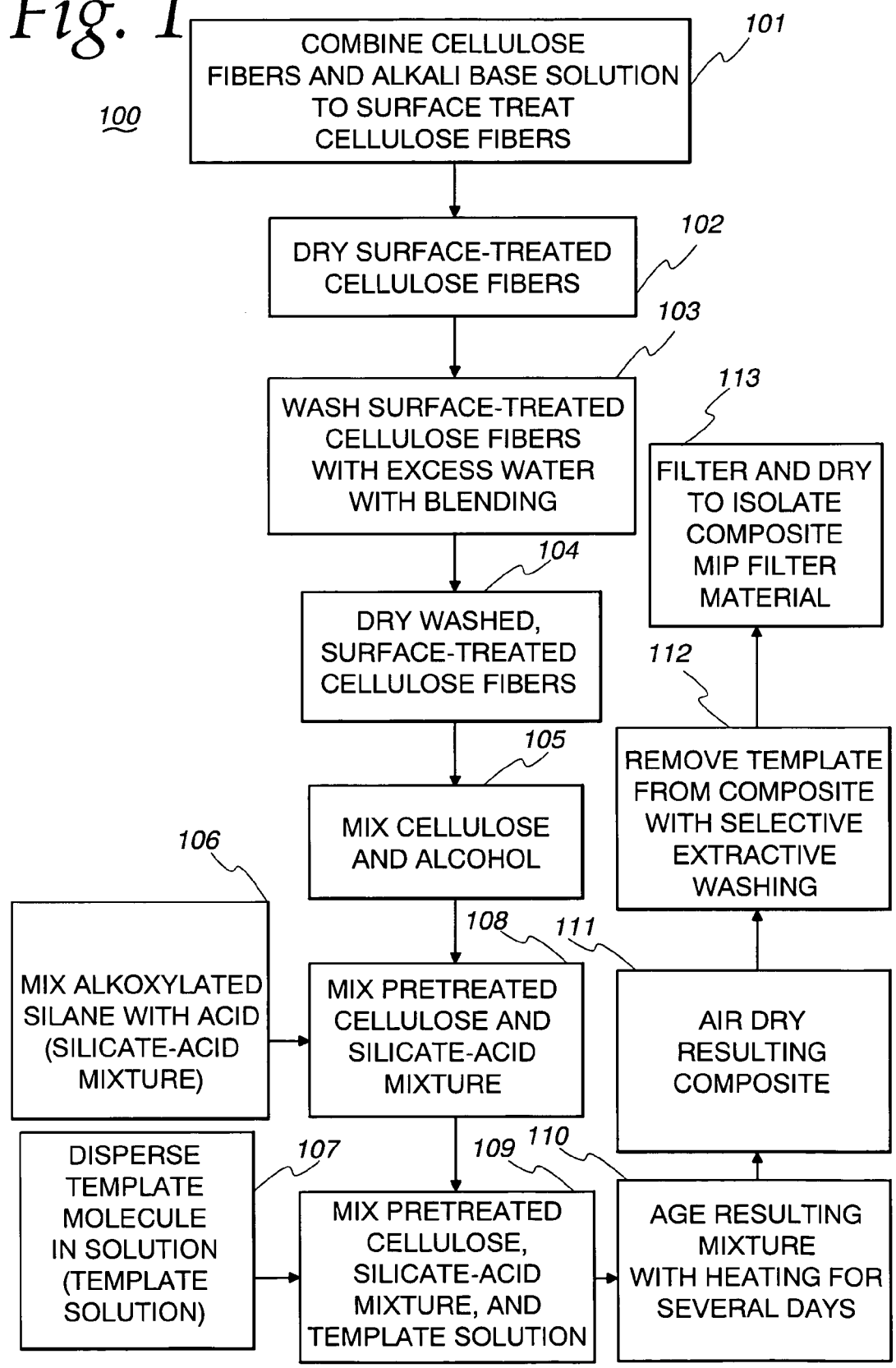
FIG. 1 is a flow chart of a one embodiment of a method according to the invention for making a filter having molecular imprinting of caffeine on a cellulose/silica composite.

This invention describes composite filter materials and methods for making and using them. This invention addresses the commercial need and demand for removal of molecules and/or compounds from industrial and manufactured products, including food products. Thus, for example, the composite filter material of this invention may be used to remove specific chemical species which are toxic, allergenic, or detrimental to the intrinsic properties of the product, or unhealthy to a consumer.

In the present invention, a method is presented for designing composite filter materials having microcrystalline silica deposited on cellulose fiber to form a filter with specific sieving or molecular filtering capabilities. Cellulose/silica composites are produced in variable cellulose/silica ratios by a unique methodology for preparing cellulose fibers for gel formation thereon and for depositing microcrystalline silica on the pretreated cellulose fibers. The method requires performance and control of a set of processing steps and parameters to form functionally superior filters.

The cellulose/silica composites made by methods of this invention are relatively inexpensive, dual-function filters. The fibrous nature of natural cellulose is utilized as a filter for particulate matter (e.g., solids suspended in liquids), and the molecularly imprinted silica stably adhered to the cellulose fibers acts as a "molecular sieve" that selectively adsorbs solutes during filter applications. Such multifunctionality is ideal for filtration applications such as paper filters, for example, capable of retaining targeted molecules such as caffeine and cholesterol. For instance, consumers sensitive to certain compounds, such as caffeine, can filter a liquid beverage known or thought to be caffeinated through a filter made according to the invention. Similarly, as another example of an implementation of a filter of this invention, drinking water can be filtered using a filter according to the invention to remove suspended particulates and specific dissolved organic compounds that may be unhealthy to the consumer or undesired in some other end use.

This invention facilitates the weeding out (exclusion) of undesirable molecules or compounds from liquids before consumption or other usage by physical means instead of chemical reactions, which typically are more complicated, expensive, and difficult to control.

In one embodiment of the present invention, a number of cellulose/silica and imprinted silica/cellulose papers are presented that are useful for removal of a variety of harmful or undesirable solute molecules from edible liquids (liquid-phase adsorption) products. In one aspect, these papers can be used by consumers to filter products, such as for purification of a flowable product, or a product that can be made flowable. Consumers are expected to be more comfortable procuring and using the inventive material, which can be formed with a paper-like appearance, under normal non-magnified conditions, that generally mimics the visual appearance of conventional filter paper products to which the consumer likely has familiarity. By contrast, filter materials consisting of porous pads filled with the adsorbent inorganic solid particles that are readily visually noticeable by a consumer generally can be expected to be less attractive to consumers to the extent the presence of "extraneous" active agents are highlighted.

FIG. 1 is a flow chart showing one non-limiting exemplary method 100 for making cellulose/silica composite materials representing this invention. Various steps of the general method illustrated in FIG. 1 are referenced in the following discussion. However, the inclusion of any particular step in FIG. 1 does not necessarily mean that the step is critical to this invention, or that other variations could not be employed, as the method described is illustrative in nature.

In an initial step 101, an aqueous suspension of cellulose fibers are surface-treated with an ionic base that dissociates in water to generate hydroxyl ions effective to provide a base-treated fibrous material. The resulting suspension is stirred until it reached a macroscopically homogenous appearance. The suspension can be blended or diluted to any useful consistency. Although not limiting, the cellulose fiber content used in the suspension generally is in the range of about 20 to about 70 percent.

Cellulose is the main component of plant fibers and wood. Cellulose is water-insoluble and tasteless. Cellulose is generally represented by the formula $(C_6H_{10}O_5)_n$, where n is an integer greater than one. The invention is not strictly limited to cellulose of that formula, and could include functionalized or modified variants thereof yet remain susceptible to treatment according to this invention, which can be ascertained empirically using the filter performance criteria described herein. In one non-limiting embodiment, cellulose useful in this invention has the following general structural formula 1.

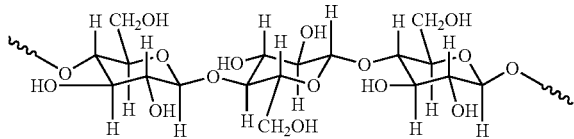

As can be seen in the above formula structure, cellulose is a polysaccharide, and has numerous pendant —OH groups and hydrolyzable C—O linkages. Cellulose can be introduced for such treatment in isolated form or as a constituent of a cellulose source. The cellulose source, for example, can include processed softwood or hardwood products (e.g., bleached or unbleached Kraft virgin softwood or hardwood fiber pulps, sulfate pulp, or chemo-thermo mechanical pulping (CTMP) fluff, and the like), hemp, cotton wool, and the like. In one preferred embodiment, the cellulose pulp form is used. Pulp refers to cellulosic fibers obtained from natural sources such as trees, hemp, cotton, flax, and so forth. The pulp fibers may be unrefined or beaten varieties. Cellulose pulps of these types are commercially available. Commercial cellulose fibers include, for example, bleached Kraft pulp sold as Celect™ by Celgar Pulp. Co., British Columbia, Canada.

The cellulose source should not contain ingredients that interfere with base surface-treatment and MIP treatments described herein. The invention is applicable to sources of cellulose having a wide range of lignin content, such as ranging from about 0 to about 30 percent lignin, although lower lignin contents are preferable, such as lignin contents of about 0.001 to about 3 percent. It has been observed that the silica anchors more securely to cellulose fibers pretreated according to this invention when the cellulose contains low levels of lignin.

The fibrous substrate material, which is used in this invention as a gel formation support or substrate, is not limited to cellulose alone. Other suitable fibrous materials for practicing this invention include modified cellulose fibers (e.g., methylcellulose), cellulose acetate fibers (e.g., cigarette filters), essentially all synthetic and natural polymer fibers with —OH groups, hydrolyzable —OR groups, amino groups, or sulfhydryl groups (e.g., chitosan, alginate, polylactic acid, nylon, polyamines, polyamides, polysolfones, polydextrines, and the like).

Mixtures of pulp fibers with other fibers or filaments added to impart other properties to the fibrous mass also can be used. For instance, staple synthetic fibers, staple natural fibers, and/or continuous filaments, can be used. The fibers may be hydrophilic or hydrophobic. For example, fibers could be blended with the pulp to impart additional structural integrity, and so forth. The fibers may be, for example, polyolefin fibers, polyester fibers, aramid fibers, polyamide fibers, carbon fibers, cotton fibers, wool fibers, and so forth. The useful fibers generally may have a length of about 2 to about 50 mm (unless a continuous filament form is used), and a denier of about 0.1 to about 10. Although not limited thereto, the admixed amount of such fibers generally will comprise less than about 50 percent, and more particularly less than about 25 percent of the pulp fiber-staple fiber fibrous mixture. If staple fibers are admixed with the pulp fibers, preferably the admixture is done before the zeolite treatment of the surface-treated pulp fibers is performed as described elsewhere herein.

The ionic base is a compound from which hydroxyl ions are generated directly or indirectly upon disassociation in water. Non-limiting examples of ionic bases that can be a source of hydroxyl ions can be selected from NaOH, KOH, $Na_2SO_3$, $Na_2CO_3$, $Na_3PO_4$, $Na_2SO_3 \cdot xH_2O$ (where x is an integer from 0 to 8, and preferably from 2 to 5), and the like, as well as combinations thereof.

Although not required, surface-treatment of the cellulose fibers with the base can be conveniently and efficiently done using an aqueous solution of the base at room temperature (i.e., about 20 to about 30° C.). Using NaOH as an example, the molarity of the base in the solution used to surface treat the cellulose fibers generally is in the range of about 0.3 M to about 5 M, and the exposure time generally is several minutes or longer. The base solution should used in sufficient concentration and in a sufficient exposure time such that the cellulose is sufficiently treated such that silica can attach to the cellulose in a stable manner and without undesirably leaching off of the cellulose upon contact with water at about 100° C., yet without the base treatment being overly aggressive such that the cellulose becomes unstable and structurally degrades in deionized water at about 100° C.

The behavior of the composite at the boiling temperature of water is significant since use of filters of this invention to decaffeinate coffee or tea, and so forth, would be done under those conditions in many applications.

The surface-treated fibrous mass is dewatered and dried (step 102). Dewatering can be performed by any convenient technique (e.g., as oven drying with forced air circulation) to yield dry surface-treated fibers. The drying procedure should be performed at a temperature at which the water can be evaporated off in a reasonable amount time but not so high as to risk damaging the cellulose fibers from undue heat. For example, the surface treated cellulose fibers can be dried by heating the surface-treated mass of cellulose fibers at approximately 100° C. until dry.

This base-treated cellulose material is thoroughly rinsed with deionized water with vigorous blending, such as in a blender, and then the pH of wash water is checked (step 103). The wash water is used to remove base that is entrapped or otherwise physically absorbed by the cellulose fibers. If the wash water pH is below about 6.9 after use, the wash water used is dumped and fresh rinse water is added to the surface-treated fibrous mass and the rinse cycle is repeated, and so on, until the used wash water has a pH of approximately 7.

After rinsing of the pre-treated fibrous mass is completed, the fibrous mass is dried again (step 104). This drying can be done, for example, in an oven with forced air circulation at approximately 100° C. for about 24 hrs. Temperatures above 100° C. are not desirable to the extent they degrade the fibers.

A molecular imprinted inorganic matrix structure is next formed on the pre-treated cellulose as a cellulosic substrate, according to steps 105–113 in this non-limiting illustration. The molecular imprinted inorganic matrix is formed using at least template molecules, sol-gel precursor, and solvent. A catalyst also can be included. The order and manner in which these components of the matrix are combined may vary.

For example, as indicated in step 105, the pre-treated cellulose can be impregnated with a solvent that will be used in forming a gel in a later step, before mixing the cellulose with the sol-gel precursor and template molecules, and any catalyst. This solvent may be a lower primary alcohol (e.g., ethanol, methanol, propanol or butanol).

The sol-gel precursor and template molecules, and any catalyst, can be added in any sequence or at the same time to the solvent-impregnated and pre-treated cellulose. Steps 106–109 indicate one non-limiting addition scenario that can be used in this respect. Alternatively, in a one pot synthesis approach, the solvent, sol-gel precursor, and the template molecules (as well as catalyst, if used) may be added at the same time to the pre-treated cellulose with mixing. The template molecule can be dispersed in any suitable solvent, depending on its relative solubility in water versus organic solvents. For example, caffeine can be dispersed on a molecular level in water. The terminology "template molecules" means the template material can be dispersed or introduced as discrete individual molecules. Clustered or clumped template molecules are undesirable as they may form large occlusions that ultimately will leave large voids in the matrix when removed and that are not useful insofar as imprinting a matrix structure on a molecular level.

The above-mentioned molecular imprinted matrix structure is a three-dimensional modified crystalline matrix structure formed on the cellulose as a matrix-formation substrate. The modified matrix structure is formed by incorporating template molecules into the crystalline matrix developed on the cellulose substrate during gel formation. This matrix formation procedure is advanced during an "aging" step by application of heat to the mixture (step 110).

The template molecules incorporated into the matrix structure are removed after gel formation, yielding a modified matrix structure that tends to be highly selective to solute molecules corresponding to the template molecules in filtering operations, thereby providing a molecular imprinted matrix structure. The template molecules correspond to a solute or solutes for which the filter is intended or expected to selectively remove during use.

Sol-gel processing as used herein generally is the preparation of ceramic, glass, or composite materials by the preparation of a sol, gelation of the sol, and removal of the solvent. In the present invention, however, gelation and solvent removal are performed in a manner in which the pretreated cellulose serves as a gel substrate. The sols are defined as colloidal particles in a liquid. Colloids are nanoscaled entities dispersed in a fluid. Gels are viscoelastic bodies that have interconnected pores of submicrometric dimensions. A gel typically consists of at least two phases, a solid network that entraps a liquid phase. In the present invention, the modified matrix structure is the solid structure and the solvent is the entrapped liquid phase.

Typical sol-gel precursors that can be used in this method as the primary component of the prepared gel structure comprise a metal or metalloid in which the metal component is selected from the group consisting of silicon, aluminum, titanium, zirconium, and vanadium. Sol-gel precursors that can be used include, for example, metal or metalloid alkoxides, and metal acetylacetonates. Silica and aluminum acetylacetonates are examples of the metal acetylacetonates that can be used. For purposes herein, silicon is considered a metal.

Preferably, the sol-gel precursor is a metal or metalloid alkoxide, e.g., tetraethyl orthosilicate (TEOS), having the structural formula $Si(OCH_2CH_3)_4$, and tetramethyl orthosilicate (TMOS), having the structural formula $Si(OCH_3)_4$. TEOS releases ethanol during gel formation, which is relatively harmless. In one preferred embodiment, the primary component of the gel structure prepared comprises silicon alkoxide precursors. Immersion of these silicon alkoxide compounds in water and a lower primary alcohol (e.g., ethanol, methanol, propanol or butanol), such as the alcohol used to impregnate the cellulose, results in a bubbly structure of solid silica type structure including interdispersed and occluded template molecules arranged in a generally regular crystalline matrix that is formed upon the cellulose. The silicon alkoxide precursors serves as functional monomers that assemble into a three-dimensional porous crystalline matrix that entraps the solvent in its interstices.

The interaction between the cellulose surface and the silica coating is facilitated by the prior partial alkali attack performed in step 101. Diluted NaOH has been generally known to promote digestability and swelling in lignocellulosic materials. Fan et al. "Cellulose Hydrolysis", Aiba et al., Eds., Biotechnology Monographs, vol. 3, Springer-Verlag, 1987, p. 60. The formation of crater-like irregularities on the surface of cellulose fibers pretreated with aqueous NaOH has been observed, which was thought to suggest that NaOH disrupted the interchain hydrogen bonding of adjacent cellulose molecules. Vu et al., "A Facile Method to Deposit Zeolites Y and L onto Cellulose Fibers", Microp. & Mesop. Mater. (2002), vol. 55, 93–101.

This disruption would increase markedly the number of exposed (cellulosic)—OH groups. Again, in one preferred embodiment, the silica source is partially oligomerized tetraethylorthosilicate (TEOS). TEOS, in the amorphous state that results from low temperature curing of the coating, contains unreacted $Si-OCH_2CH_3$ pendant groups. The anchoring of the silica oligomers onto the activated cellulose surface should thus occur by chemical attack of such reactive silica moieties by the surface —OH groups, releasing an ethanol molecule from the Si oligomer and creating a C—O—Si linkage. Such "hydrolytic surface process" can be catalyzed by the presence of base (i.e., trace NaOH adsorbed on the surface). That is, the silicon alkoxide precursors are thought to react with hydroxyl groups on the pretreated cellulose in the presence of the catalysts, acidic and basic, to covalently functionalize and attach or graft upon the cellulose as a substrate like surface. The pretreatment of the cellulose fiber with the ionic base, such as in step 101 earlier, enhances the anchoring and immobilization of the matrix formed during gel-sol formation upon the cellulose.

A variety of catalysts can be used to aid in the gelation of the template/sol-gel-precursor mixture upon the cellulose substrate. These catalysts may be acidic or basic, depending on the desired properties of the final product. These catalysts include, but are not limited to, aqueous hydrochloric acid, nitric acid, formic acid, and sulfuric acid, aqueous solutions of alkaline and alkaline earth hydroxides (e.g., CsOH) as well as organic bases. For example, hydrochloric acid can be included to accelerate the matrix development. The sol-gel processing used in the present invention can provide control of microstructures in the silica matrix formed on the cellulose substrate that is in the nanometer size range (i.e., 1 to 100 nm (0.001 to 0.1 μm)), which approaches the molecular level.

At this juncture, a composite mass is formed involving a composite sol gel comprising a three-dimensional porous network formed of the silicon alkoxide moieties and occlusions therein of the template molecules, anchored upon the cellulose.

The entrapped lower primary alcohol or other solvent, and any water, is removed from the composite mass in a subsequent drying step (step 111). For example, alcohol is removed from the gel and any water in the composite mass is removed by air drying the composite mass in an oven at 65° C. for about 5 hours. The air drying is not done under supercritical fluid drying conditions that are commonly used in aerogel processing technologies. Consequently, the modified gel collapses during the drying operation, but remains anchored to the cellulose substrate and retains sufficient porosity when wefted for filtration purposes.

The resulting dried intermediate cellulose/silica composite is then washed with a solvent that will selectively remove the template molecules from the inorganic matrix while leaving the remaining inorganic matrix in place on the cellulose substrate (step 112).

It will be apparent that the use of ethanol as this solvent serves at least two advantageous purposes during removal of the caffeine template. First, there is the apparent industrial advantage when the process of MIP production is scaled up for removing the template, and ultimately recovering it as an ethanol/caffeine solution. In this way, either crystallization or distillation, or some other unit operation process, can later be applied for recovery of both pure solvent and caffeine. The second function of absolute ethanol has is to rinse the material, and prepare it for low-temperature drying. A residue of pure ethanol is easily removed by moderate heating (<100° C.), which is critical to prevent thermal relaxation of the imprinted surface.

After the resulting composite is dried (step 113), a particular geometry in filter shape can be imparted to the composite material if needed or desired. These shapes may include, for example, a basket, cone or disc shape. To impart the three-dimensional filter shape, a moistened form of the dried product of step 113 can be molded into the desired shape using heat and compression forces applied to the composite material while positioned on a former or other suitable equipment used for that purpose. For instance, once a stable cellulose/silica material, such as in its "loose fibers" state, is synthesized by the method described herein, carton- or paper-like cellulose/silica filters can be produced by contacting the composite with distilled water to incipient wetness, followed by applying pressure for a period of time sufficient to impart a permanent shape in the fibrous mass.

For example, the fibrous mass may be compressed at about 0.3 to about 7 ton/cm$^2$ pressure at about 100° C. for several minutes to achieve this result. Pressure roller arrangements or static presses, and so forth, can be used to compact and, if needed, shape, the composite to the desired thickness (and shape). The finished composite filter material may have a thickness ranging from about 1 mm to about 5 cm, which may vary depending on the filtration application for which the filter material will be used. For instance, where the composite filter will be used to decaffeinate an aqueous beverage, the density and thickness of the filter will manufactured with an eye towards ensuring that the fluid can be sieved/filtered through the filter in a reasonable amount of time. For example, in consumer filter applications, the composite filters of the present invention preferably are sized to allow filtration of about a cup (i.e., 8 fluid ounces, 237 mL) of caffeinated beverage with several minutes. The composite preferably is substantially free of any visible voids. The dried composite filter material also can optionally be subject to post-finishing procedures, such as mechanical treatments, such as embossing, and/or chemical treatments, such as dyeing or imprinting. A porous cellulose/silica filter paper manufactured in this general manner provides molecular sieving properties.

The resulting cellulose/silica composite material obtained can be used by itself in filtration applications, or, alternatively, it can be arranged in a multilayer or laminate filter structure. For instance, in the multilayer structure arrangement, at least one layer can be formed of the cellulose/silica composite filter material described herein together with at least one other layer to provide structural stability or other desired properties. The other layer could be, for example, a nonwoven fabric layer, a woven fabric layer, apertured films, cheesecloth, combinations of these, and so forth. For instance, at least one of the composite layers may be sandwiched between outer macroporous cloth layers that have overlapped free edges extending beyond the edges of the sandwiched composite filter layer that are joined together. Alternatively, the filter could also contain several layers of composite filter material, wherein each layer is imprinted using a different template molecule. The different layers can be consolidated into a unitary structure by any convenient technique, including those conventionally used to combine multilayer fabric products.

The following example is intended to illustrate the invention and not to limit it. Unless otherwise indicated, all percentages, ratios, or parts used in the present specification are by weight. All patents and other publications cited in the present specification are hereby incorporated by reference.

EXAMPLE 1

Pretreatment of Cellulose Fibers with Alkali Hydroxide

Based on extensive experimentation, it has been found that silicas adhere much better to lower lignin content cellulose fibers after their surfaces have been pre-treated with aqueous sodium hydroxide or another ionic alkali base that generates hydroxyl groups in solution.

Four grams of lose cellulose fibers (Celect™ Bleached Kraft pulp from the Celgar Pulp Co., British Columbia, Canada) were suspended in 40 mL of 0.55 M sodium hydroxide solution in a 150 mL Teflon reactor. The cellulose fiber utilized in this study has a very low lignin content (approximately 0.1 percent lignin, according to the manufacturer). The slurry was stirred continuously for approximately 5–10 minutes until it achieved a homogeneous appearance. The reactor was then placed in an oven with forced air circulation at 100° C. The contents were mixed occasionally with the aid of a stirring rod until a dry solid remained. The residue was then removed from the oven and mixed and thoroughly blended with an excess of distilled water in a household blender. The purpose of blending is the removal of physically absorbed sodium hydroxide from the cellulose fibers. The solid residue was finally rinsed thoroughly with distilled water and kept in an oven at 100° C. for 24 hours. The NaOH-treated, dry cellulose fibers were subsequently used for MIP synthesis.

Preparation of Molecular Imprinted Paper (MIP): All chemicals were purchased as analytical or HPLC grade and used without further purification. Tetraethyl orthosilicate (TEOS) 98 percent, caffeine 99 percent, carbon tetrachloride 99.9 percent A.C.S grade, theophylline 99 percent, and chloroform 99.9 percent HPLC grade were purchased from Sigma-Aldrich. Ethanol 200 -proof absolute, ACS grade, was purchased from VWR. For the successful preparation of a molecularly imprinted paper (MIP) material, the following procedure and protocol was used: 0.48 mmol of caffeine was dissolved in 25 mL of distilled water (solution "a"). In a separate glass vial, 4.8 mmol of TEOS were mixed with 9.6 mmol of 0.12N HCl. This mixture (labeled as "b") was stirred magnetically for 30 minutes. Two grams of pretreated cellulose were mixed with 30 mL of ethanol (200 proof) in a capped Teflon reactor. Ethanol was used for impregnation purposes. Mixture "b" was added to the contents of the Teflon reactor and the combined contents were mixed well mechanically for approximately 30 minutes at room temperature. In all these preparations, caffeine:TEOS:HCl (0.12N) molar ratios of 1:10:20 were maintained. The Teflon reactor was sealed tightly and kept in an oven at 65° C. for 75 hours. After 75 hours of aging time, the reactor lid was removed and the contents were air-dried in an oven at 65° C. for approximately 5 hours. Removal of the template was then done by washing with ethanol. The dried contents were mixed with 80 mL ethanol and kept in oven at 65° C. with occasional stirring. Two extraction batches of identical ethanol volume, each of two hours duration were performed for the complete removal of template. After the washing process, the contents were filtered and the solid residue was dried again in an oven 110° C. overnight.

This solid is finally labeled as "MIP paper". In order to compare the performance of our imprinted material with an unimprinted one, a sample labeled as "BLANK" was also prepared. The BLANK was prepared using the same recipe thereby keeping the molar ratios of cellulose:TEOS:HCl (0.12N) the same as before but without adding the template (caffeine). The process of silica loading onto cellulose was also monitored. For this purpose, different cellulose/silica ratios were tried. The cellulose:silica mass ratios were varied from 4:1 to 4:4. In all these samples, the caffeine:TEOS:HCl (0.12N) molar ratios of 1:10:20 were maintained.

Characterization of Composite Products: Several experiments were performed to characterize the MIP composite products of the above-exemplified method. Several techniques such as diffuse reflectance infrared spectroscopy (DRIFTS), transmission fourier transform infrared (FTIR) spectroscopy using demountable path length cell, liquid-phase adsorption rate measurements, and BET specific surface area measurements were used to characterize these MIP composites.

The removal of template (caffeine) and the effect of preparation parameters such as different silica/cellulose mass ratios were investigated by means of diffuse-reflectance infrared fourier transform spectroscopy (DRIFTS). A Nicolet® 20 SXB fourier transform spectrometer was used for this purpose. The gases were allowed to flow through the DRIFTS cell via a stainless steel reaction system manifold equipped with Brooks® 5850 mass-flow controllers. The BET surface areas of materials with varying cellulose/silica ratios were determined with the aid of a custom-built gas adsorption system. The uptake of caffeine and theophylline on imprinted materials were performed in order to test the response and comparative binding capabilities of imprinted material for the target molecule. For the adsorption experiments, 16 mg of caffeine was dissolved in 60 mL of carbon tetrachloride in a glass vial. In the second vial, 2.00 g of imprinted material was suspended in 30 mL of carbon tetrachloride. At time zero, both these contents were mixed and then very small aliquots were sampled out and loaded in a demountable path length cell at various times, which were then analyzed by transmission fourier transform infrared (FTIR) spectroscopy. In all of these adsorption experiments, the protocol remained the same but different types of imprinted materials were used.

Figure 2:
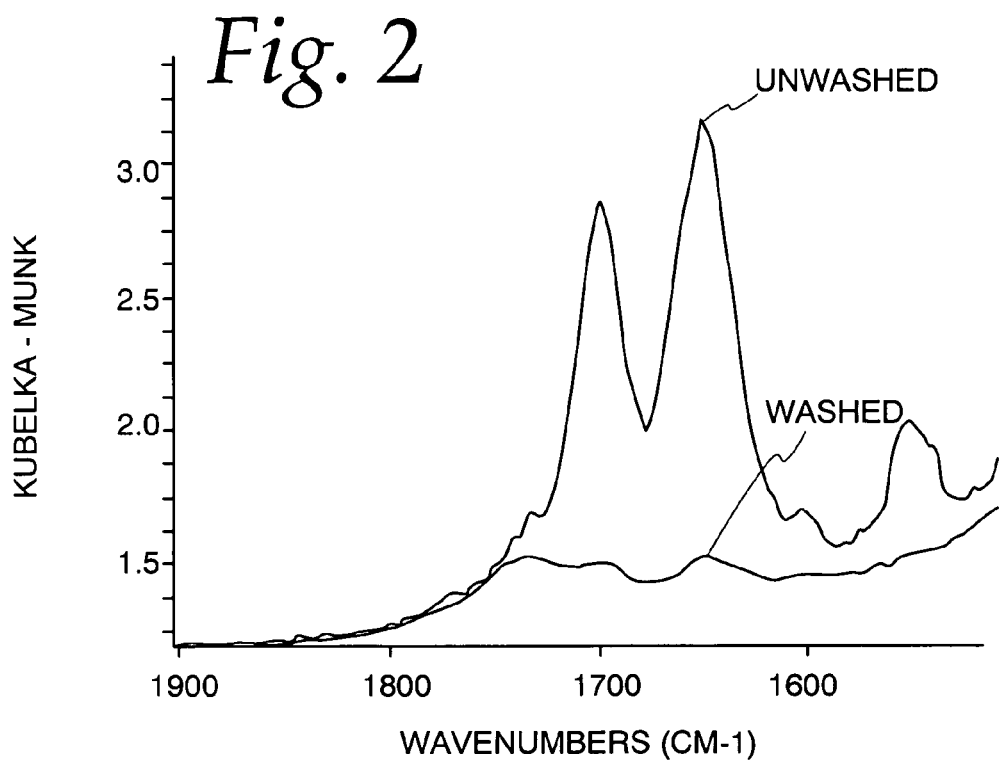
FIG. 2 is shows diffuse-reflectance infrared fourier transform spectroscopy (DRIFTS) spectra obtained from washed and unwashed MIP materials prepared according to the example described herein.

Data Analysis Techniques and Results: The removal of the template (caffeine) in the fibrous (imprinted) material was investigated by analyzing the sample both before and after washing with ethanol using DRIFTS. FIG. 2 shows the DRIFTS spectrum obtained for the washed and unwashed materials. The unwashed material shows the intense —$NH_2$ "scissor" bending signals of caffeine around 1703 and 1657 $cm^{-1}$ wave numbers (approx. intensity of 3.25 on arbitrary units), whereas the intensity of this signal for washed material is markedly reduced. The decrease in the intensity of —$NH_2$ signals clearly shows that most of the template (caffeine) was removed from the imprinted solids after two batches of washing. The key is to effect extraction of the template at low to moderate temperatures to preserve the imprint.

Figure 3:
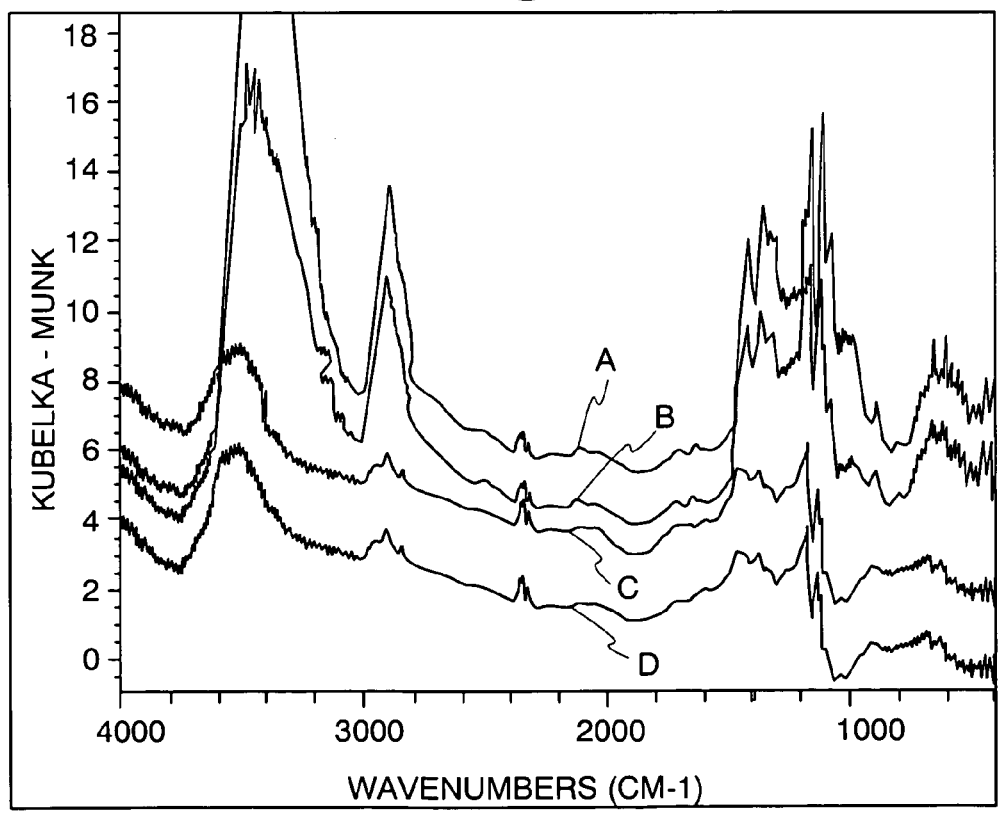
FIG. 3 provides DRIFTS spectra of MIP materials with varying (starting) cellulose to silica mass ratios prepared according to Example 1.

The effect of different amounts of silica loadings on the cellulose fibers was also investigated. The caffeine-loaded samples were analyzed again by DRIFTS and the results are shown in FIG. 3. Spectra a, b, c and d represents the imprinted materials prepared with cellulose:silica mass ratios of 4:2, 4:1, 4:3, 4:4, respectively. The signals due to the so-called neosilicates were analyzed. The signals around 900 $cm^{-1}$ show a sharp peak and in addition a fairly broad peak with a weak shoulder having a sharp peak on the low frequency side (678–628 $cm^{-1}$), which is a characteristic of neosilicates and used for qualitative analysis of silica loading. It was found after the comparison of the relevant signal that the material with cellulose:silica mass ratio of 4:2 shows the most intense signal followed by 4:1, 4:3 and 4:4 respectively. The starting cellulose/silica mass ratio was optimized to 4:2 based on the amount of silica deposited on cellulose and this mass ratio was used in all subsequent preparations. The BET surface area of these materials was investigated using our custom-built gas adsorption system. The results are tabulated in Table 1. Table 1 shows the BET surface areas of the MIP material with varying cellulose to silica mass ratios and also the unimprinted material, which is referred to herein as "BLANK." The material with a starting cellulose/silica mass ratio of 4:2 shows the maximum BET surface area, which is in agreement with the IR data. It appears that the sol-gel derived silica coating is the main contributor to porosity (the bare cellulose fibers have a surface area of about 20 $m^2/g$).

Figure 4:
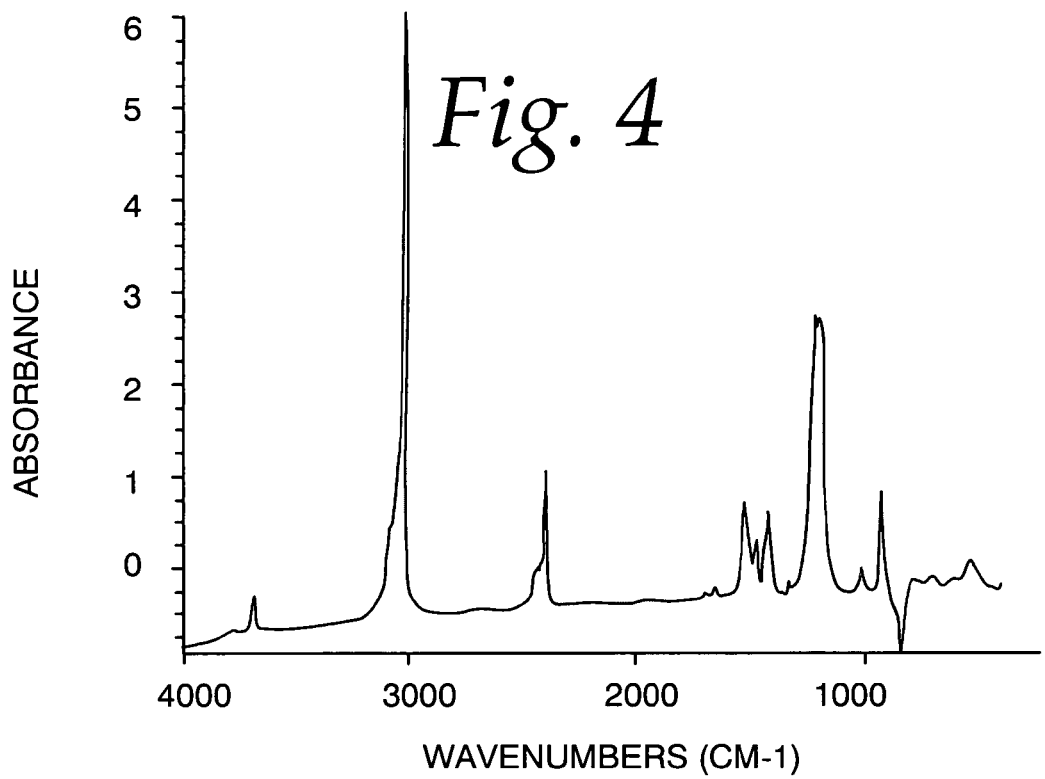
FIG. 4 is a DRIFTS spectrum for the adsorption of caffeine by the MIP material at time t=0 using chloroform as solvent prepared according to Example 1.
Figure 5:
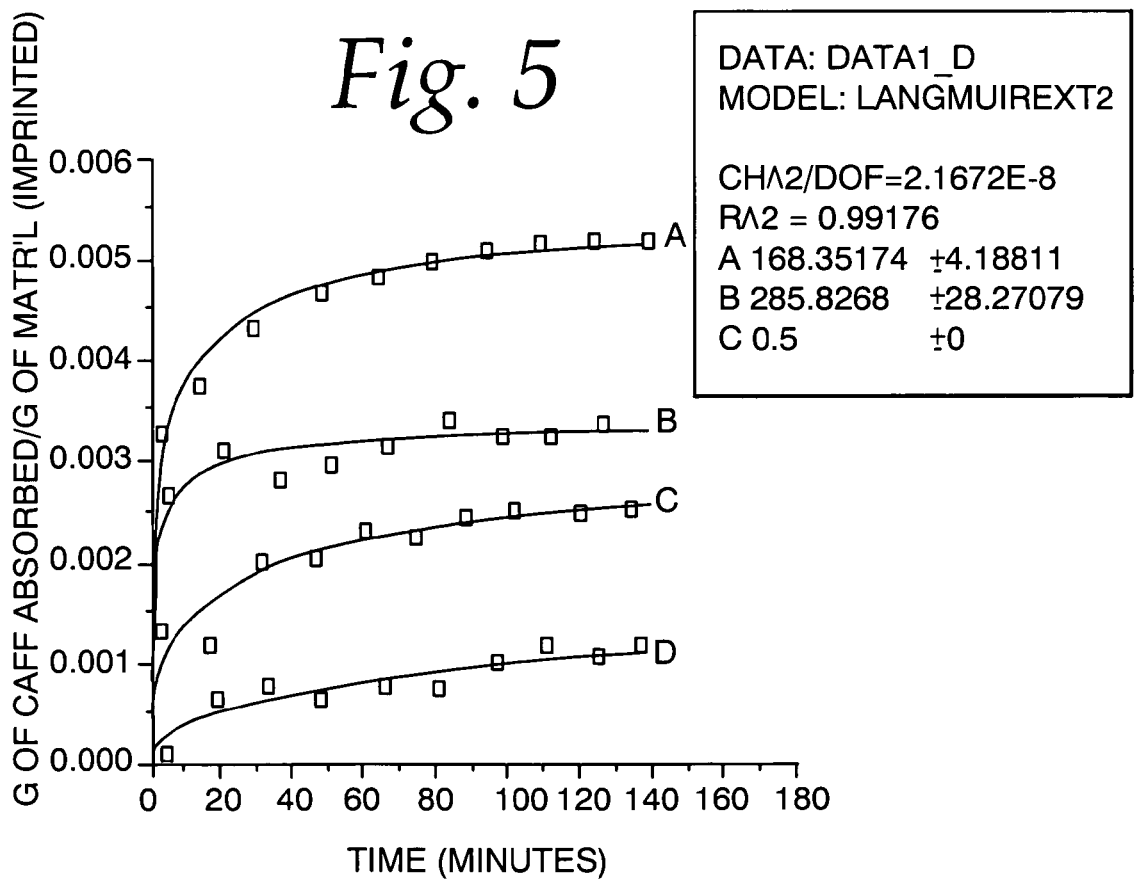
FIG. 5 is a graph with plots showing adsorption of caffeine (in grams) per gram of MIP material with varying cellulose/silica ratios (CCl4 as solvent) prepared according to Example 1.

For the liquid-phase adsorption experiments of caffeine on the imprinted materials, FTIR was used to track the depletion of the target in solution. A representative spectrum obtained for a liquid sample at certain time is shown in FIG. 4. For the quantification of these adsorption experiments, the signal at 3683 $cm^{-1}$ wave number due to the C—H stretching of chloroform and the signal between 1702–1652 $cm^{-1}$ wave number due to the —$NH_2$ scissors of caffeine were used. The areas under theses peaks were calculated using the Nicolet's OMNIC software. In FIG. 5, curves a, b, c and d represents the amount of caffeine adsorbed (grams) per gram of imprinted materials with varying cellulose to silica ratios of the order of 4:2, 4:1, 4:3 and 4:4 respectively. It is evident that the imprinted material with cellulose to silica ratio of 4:2 adsorbed maximum caffeine (almost 0.00519 grams absorbed per gram of MIP).

Figure 6:
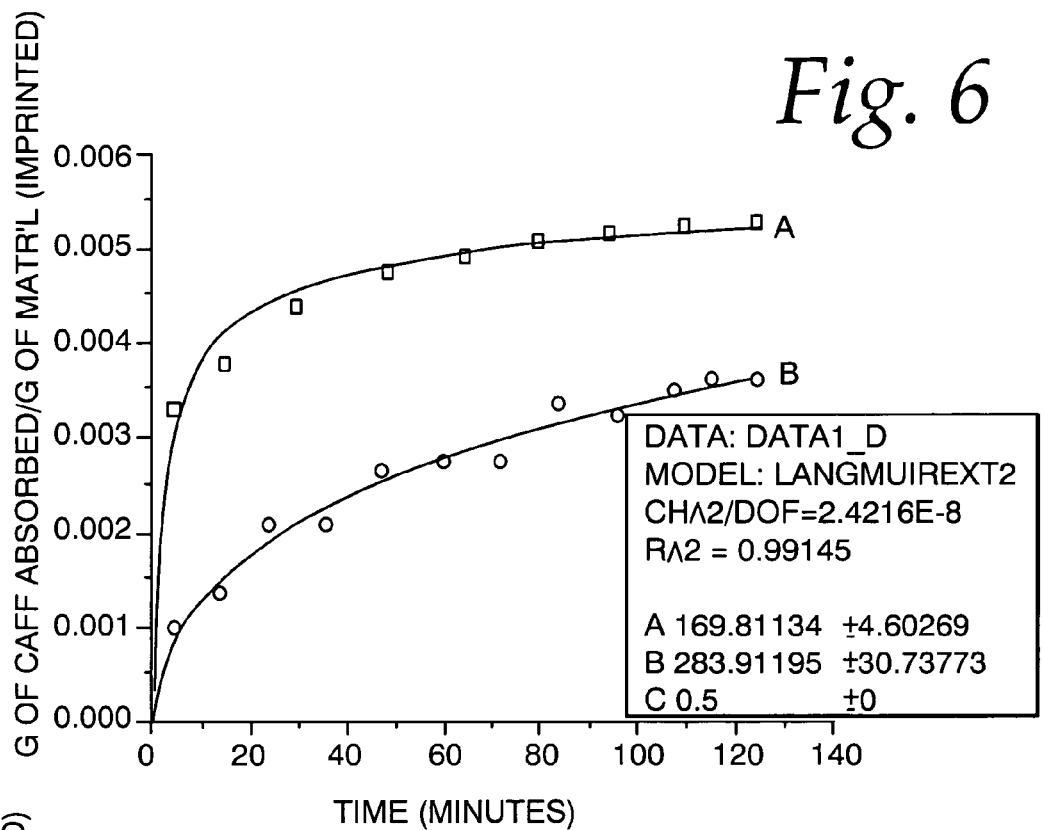
FIG. 6 is a plot showing adsorption of caffeine (in grams) per gram of imprinted and BLANK materials using carbon tetrachloride as solvent prepared according to Example 1.

In additional MIP preparations, cellulose to silica mass ratio of 4:2 was adopted. In order to investigate the performance of the MIP material, its caffeine adsorption capacity was checked against that of the blank. The uptake of caffeine by both these materials is shown in FIG. 6. Curve "a" is the uptake (in grams) of caffeine per gram of the MIP material where as the curve "b" is the uptake of the BLANK material (unimprinted). It is evident that the adsorption of caffeine by the MIP is higher than that of the untemplated (BLANK), even though both have the same silica content. The most important fact to observe is the much higher adsorption rate of the MIP material, which is a most desirable feature in situations where very short contact times (e.g., in paper filters) are bound to occur. The BET surface area for the MIP material is higher than the BLANK at the 4:2 cellullose:silica mass ratio, as reported in Table 1.

TABLE 1

| Mass Ratio (Cellulose:silica) | 4:1 | 4:2 | 4:3 | 4:4 | BLANK (4:2) |
|---|---|---|---|---|---|
| BET Surface Area ($m^2/g$) | 90.0 | 147.8 | 81.2 | 79.6 | 101.9 |

The specificity of the molecular imprints on the cellulose/silica composite was also investigated. To this end, the adsorption of caffeine and a caffeine-like molecule (theophylline) were compared in cellulose/silica composites made according to this invention. The molecular structures of both caffeine and theophylline are shown below. Differing by just one methyl group, any difference in the adsorption performance for these two adsorbates would be remarkable.

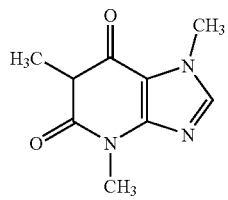

Caffeine

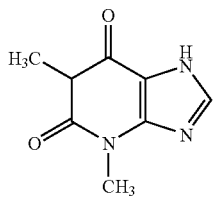

Theophylline

Figure 7:
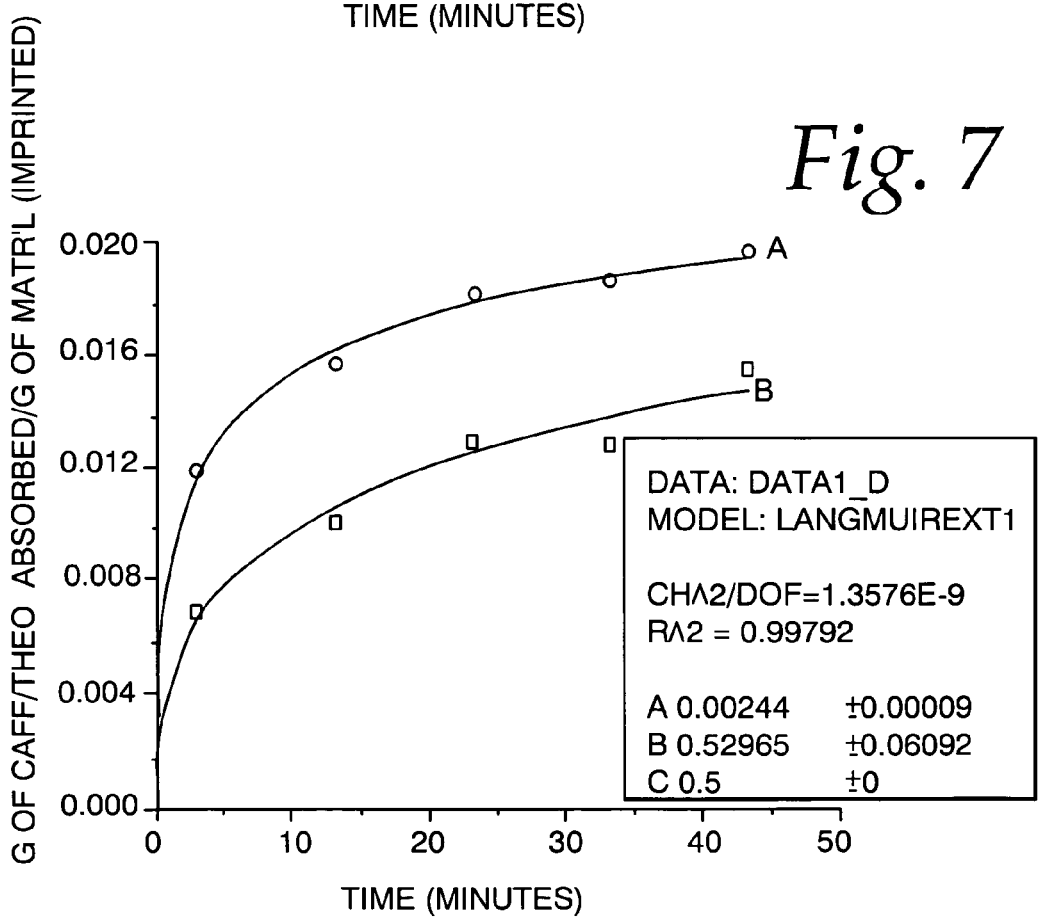
FIG. 7 is a plot showing comparison of the adsorption of caffeine and theophylline per gram of the MIP material using chloroform as solvent.

For this set of adsorption experiments, the procedure was kept identical to the protocol described previously, except for the solvent employed. In this case, chloroform was used instead of carbon tetrachloride. Theophylline was found to be insoluble in carbon tetrachloride. The results obtained in these experiments are shown in FIG. 7. In this figure, curve "a" is the uptake of caffeine per gram of MIP material where as curve "b" represents the uptake of theophylline by the same MIP material. Clearly, MIP shows greater and more rapid binding capabilities for caffeine than theophylline.

These experimental results demonstrate that the present invention provides a unique method for molecular imprinting of solutes on cellulose/silica composites that provides a material that can serve as a paper that can selectively bind caffeine, or other solutes. This invention provides a microporous membrane with molecular sieving characteristics, and based on flexible and cheap organic matrixes such as cellulose, which could later be pressed into a paper-like form. The resulting imprinted material, which is designated as a molecularly imprinted paper (MIP), can be used to make paper filters.

These MIP materials not only show enhanced binding capabilities towards the template molecules (e.g., caffeine) in comparison to blank experiments, but also were found to discriminate between theophylline and caffeine with good selectivity. A cellulose:silica ratio of 4:2 was found to be close to optimal. It is noteworthy that the MIP material has more affinity for caffeine than theophylline, which is a significant challenge in a comparative adsorption situation, given the close structural similarities between these two molecules. The pretreatment of cellulose fibers with sodium hydroxide facilitates adherence of sol-gel derived silica, and was found to be stable at 100° C.

Although the above example illustrates the suitability of the imprinted silica/cellulose composite as a filter paper for decaffeinating a beverage liquid, it will be appreciated that the composite has much wider application as a highly selective molecular sieve. For instance, the cellulose/silica filter paper also can be used to remove cholesterol from food lipid matrix (e.g., egg yolk, butter fat, beef tallow, or fish oil) that can be rendered flowable. It also could be used to remove organic compounds such as pesticides or herbicides from drinking water, to remove sugars (e.g., monosaccharides, disaccharides, oligosaccharides) from natural food matrices, and to remove aldehydes and ketones from food lipids. Molecules of these solutes would be used to molecularly imprint the paper in a similar manner as illustrated above with caffeine.

While the invention has been described in terms of preferred embodiments, those skilled in the art will recognize that the invention can be practiced with modification within the spirit and scope of the appended claims.

What is claimed is:

1. An adsorbent filter material useful for removing a solute from a fluid, comprising:
   a liquid permeable fibrous support material comprising fibers having hydroxyl groups, hydrolyzable alkoxyl groups, amino groups, or sulfhydryl groups; and
   an adsorbent porous inorganic gel coating on the fibrous support material, wherein the inorganic gel coating has been molecularly imprinted for the solute using template molecules present during formation of the inorganic gel coating but selectively removed thereafter from the filter material, wherein the fibrous support material comprises cellulose having a lignin content of less than 1.0 percent, the support material having been surface treated sufficiently so as to maintain attachment of the gel coating to the support material, without leaching off of the support material, upon contact with water at about 100 degrees C.

2. An adsorbent filter material useful for removing a solute from a fluid, comprising:
a liquid permeable fibrous support material comprising fibers having hydroxyl groups, hydrolyzable alkoxyl groups, amino groups, or sulfhydryl groups; and
an adsorbent porous inorganic gel coating on the fibrous support material, wherein the inorganic gel coating has been molecularly imprinted for the solute using template molecules present during formation of the inorganic gel coating but selectively removed thereafter from the filter material, wherein the molecular imprinting comprises alterations to the inorganic gel coating imparted by the presence of caffeine as template molecules during formation of the inorganic gel coating, and subsequent removal of the template molecules while leaving the inorganic gel coating anchored in place to the fibrous support material, the support material having been surface treated sufficiently so as to maintain attachment of the gel coating to the support material, without leaching off of the support material, upon contact with water at about 100 degrees C.

3. A method of making an adsorbent filter material useful for removing a solute from a fluid, comprising:
contacting a fibrous material comprising fibers having hydroxyl groups or hydrolyzable alkoxyl groups with a fluid containing a base that dissociates in water to generate hydroxyl ions to provide a fibrous support material comprising surface-treated fibers;
combining the fibrous support material with a sol gel precursor, a gel formation solvent, and template molecules, with mixing;
forming an inorganic gel coating on the surface-treated fibers, including molecularly imprinting the solute on the inorganic gel coating with the template molecules present during formation of the inorganic gel coating;
selectively removing the template molecules from the gel coating by washing the gel coating with a solvent that selectively removes the template molecules to provide a composite MIP filter material.

4. The method of claim 3, comprising selecting the fibrous support material from the group consisting of cellulose, methylcellulose, cellulose acetate fiber, chitosan, alginate, polylactic acid, nylon, polyamine, polyamide, polysolfone, polydextrine, and combinations thereof.

5. An adsorbent filter material useful for removing a solute from a fluid, comprising:
a liquid permeable fibrous support material comprising fibers having hydroxyl groups, hydrolyzable alkoxyl groups, amino groups, or sulfhydryl groups; and
an adsorbent porous inorganic gel coating on the fibrous support material, wherein the inorganic gel coating has been molecularly imprinted for the solute using template molecules present during formation of the inorganic gel coating but selectively removed thereafter from the filter material, wherein the inorganic gel coating comprises a gel structure comprising a metal or metalloid comprising metal selected from the group consisting of silicon, aluminum, titanium, zirconium, and vandium, the support material having been surface treated sufficiently so as to maintain attachment of the gel coating to the support material, without leaching off of the support material, upon contact with water at about 100 degrees C.

6. A method of making an adsorbent filter useful for removing a solute from a fluid, comprising:
contacting cellulose fibers with a fluid containing a base that dissociates in water to generate hydroxyl ions to provide a fibrous support material comprising surface-treated cellulose fibers;
impregnating the surface-treated cellulose fibers with an organic solution;
combining the impregnated cellulose fibers with a sol gel precursor and template-molecules, with mixing;
forming an inorganic gel coating on the surface-treated cellulose, including molecularly imprinting the solute on the inorganic gel coating with the template molecules present during formation of the inorganic gel coating;
selectively removing the template molecules from the gel coating by washing the inorganic gel coating with a solvent for the template molecules to provide a composite MIP filter material.

7. The method according to claim 6, wherein the inorganic gel coating forming comprises forming a sol gel with a gel precursor selected from a metal or metalloid in which the metal component is selected from the group consisting of silicon, aluminum, titanium, zirconium, and vanadium.

8. The method according to claim 6, wherein the inorganic gel coating forming comprises forming a sol gel with a gel precursor comprising a silicon alkoxide.

9. The method according to claim 6, wherein the cellulose fiber is selected as having a lignin content of less than 1 percent.

10. The method according to claim 6, wherein the template molecule is selected from the group consisting of caffeine, cholesterol, lipid, sugar, and organocidal compounds.

11. The method according to claim 6, further comprising compressing the MIP composite material into a self-supporting unitary shape.

12. A method for filtering an edible liquid or beverage so as to remove suspended particulate matter while removing a harmful or undesirable solute from the edible liquid or beverage, comprising:
providing an adsorbent filter material, wherein the filter material comprises a liquid permeable fibrous support material comprising fibers having hydroxyl groups or hydrolyzable alkoxyl groups, and an adsorbent porous inorganic gel coating on the fibrous support material, wherein the inorganic gel coating has been molecularly imprinted for the solute using template molecules present during formation of the inorganic gel coating but selectively removed thereafter from the filter material; and
passing an edible liquid or beverage containing a harmful or undesirable solute through the adsorbent filter to remove the suspended particulate matter by the support material while selectively retaining the solute in the gel coating to yield a purified edible liquid or beverage product, wherein the inorganic gel coating comprises silica, and the fibrous support material comprises cellulose.

13. A method for filtering an edible liquid or beverage so as to remove suspended particulate matter while removing a harmful or undesirable solute from the edible liquid or beverage, comprising:
providing an adsorbent filter material, wherein the filter material comprises a liquid permeable fibrous support material comprising fibers having hydroxyl groups or hydrolyzable alkoxyl groups, and an adsorbent porous inorganic gel coating on the fibrous support material, wherein the inorganic gel coating has been molecularly imprinted for the solute using template molecules present during formation of the inorganic gel coating but selectively removed thereafter from the filter material; and passing an edible liquid or beverage containing a harmful or undesirable solute through the adsorbent filter to remove the suspended particulate matter by the support material while selectively retaining the solute in the gel coating to yield a purified edible liquid or beverage product, wherein the fluid comprises a caffeinated fluid and the solute comprises caffeine.

14. The method according to claim 13, wherein the liquid or beverage product comprises a caffeinated fluid selected from coffee, tea, cola or carbonated soda drink.

15. A method for filtering an edible liquid or beverage so as to remove suspended particulate matter while removing a harmful or undesirable solute from the edible liquid or beverage, comprising:

providing an adsorbent filter material, wherein the filter material comprises a liquid permeable fibrous support material comprising fibers having hydroxyl groups or hydrolyzable alkoxyl groups, and an adsorbent porous inorganic gel coating on the fibrous support material, wherein the inorganic gel coating has been molecularly imprinted for the solute using template molecules present during formation of the inorganic gel coating but selectively removed thereafter from the filter material; and passing an edible liquid or beverage containing a harmful or undesirable solute through the adsorbent filter to remove the suspended particulate matter by the support material while selectively retaining the solute in the gel coating to yield a purified edible liquid or beverage product, wherein the fluid comprises a lipid-containing material in a flowable state and the solute comprises cholesterol.

16. The method according to claim 15, wherein the liquid or beverage product comprises a lipid-containing material selected from egg yolk, butter fat, beef tallow, and fish oil.

17. A method for filtering an edible liquid or beverage so as to remove suspended particulate matter while removing a harmful or undesirable solute from the edible liquid or beverage, comprising:

providing an adsorbent filter material, wherein the filter material comprises a liquid permeable fibrous support material comprising fibers having hydroxyl groups or hydrolyzable alkoxyl groups, and an adsorbent porous inorganic gel coating on the fibrous support material, wherein the inorganic gel coating has been molecularly imprinted for the solute using template molecules present during formation of the inorganic gel coating but selectively removed thereafter from the filter material; and passing an edible liquid or beverage containing a harmful or undesirable solute through the adsorbent filter to remove the suspended particulate matter by the support material while selectively retaining the solute in the gel coating to yield a purified edible liquid or beverage product, wherein the edible liquid or beverage comprises water and the solute comprises an organic compound selected from a pesticide and a herbicide.

18. A method for filtering an edible liquid or beverage so as to remove suspended particulate matter while removing a harmful or undesirable solute from the edible liquid or beverage, comprising:

providing an adsorbent filter material, wherein the filter material comprises a liquid permeable fibrous support material comprising fibers having hydroxyl groups or hydrolyzable alkoxyl groups, and an adsorbent porous inorganic gel coating on the fibrous support material, wherein the inorganic gel coating has been molecularly imprinted for the solute using template molecules present during formation of the inorganic gel coating but selectively removed thereafter from the filter material; and passing an edible liquid or beverage containing a harmful or undesirable solute through the adsorbent filter to remove the suspended particulate matter by the support material while selectively retaining the solute in the gel coating to yield a purified edible liquid or beverage product, wherein the edible liquid or beverage comprises a natural food matrix in a flowable state and the solute comprises a sugar.

19. A method for filtering an edible liquid or beverage so as to remove suspended particulate matter while removing a harmful or undesirable solute from the edible liquid or beverage, comprising:

providing an adsorbent filter material, wherein the filter material comprises a liquid permeable fibrous support material comprising fibers having hydroxyl groups or hydrolyzable alkoxyl groups, and an adsorbent porous inorganic gel coating on the fibrous support material, wherein the inorganic gel coating has been molecularly imprinted for the solute using template molecules present during formation of the inorganic gel coating but selectively removed thereafter from the filter material; and passing an edible liquid or beverage containing a harmful or undesirable solute through the adsorbent filter to remove the suspended particulate matter by the support material while selectively retaining the solute in the gel coating to yield a purified edible liquid or beverage product, wherein the edible liquid or beverage comprises a food lipid or an oxidized food lipid in a flowable state, and the solute is selected from an aldehyde and a ketone.

* * * * *

UNITED STATES PATENT AND TRADEMARK OFFICE
CERTIFICATE OF CORRECTION

PATENT NO.        : 7,122,122 B2
APPLICATION NO. : 10/624229
DATED             : October 17, 2006
INVENTOR(S)       : Marquez-Sanchez et al.

It is certified that error appears in the above-identified patent and that said Letters Patent is hereby corrected as shown below:

-On Title page, col. 2, under (U.S. Patent Documents), line 6, after "2001/0040136 A1* 11/2001 Wei et al.", insert -- 210/767 -- .

Signed and Sealed this

Ninth Day of January, 2007

JON W. DUDAS
*Director of the United States Patent and Trademark Office*